Figure 1:
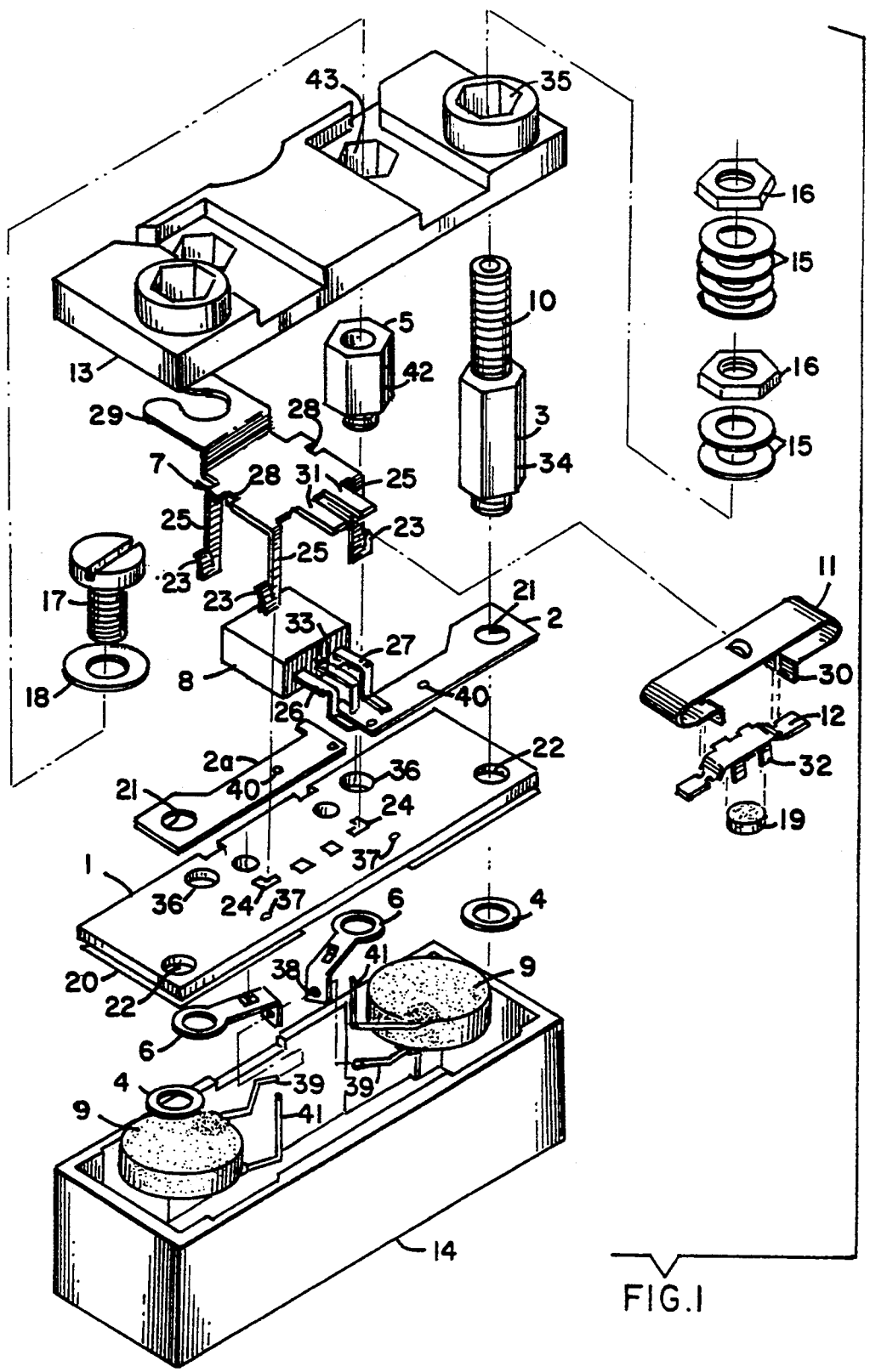

United States Patent [19]

Shannon et al.

[11] Patent Number: 5,410,596
[45] Date of Patent: Apr. 25, 1995

[54] STATION PROTECTOR MODULE FOR NETWORK INTERFACE DEVICE

[75] Inventors: William J. Shannon, Saco; John P. DuBois, Auburn; John J. Napierkowski, Cape Elizabeth; Dan Kidd, Cornish, all of Me.

[73] Assignee: Siecor Corporation, Hickory, N.C.

[21] Appl. No.: 127,106

[22] Filed: Sep. 27, 1993

Related U.S. Application Data

[63] Continuation of Ser. No. 591,992, Oct. 1, 1990, abandoned.

[51] Int. Cl.⁶ .............................................. H04M 9/00
[52] U.S. Cl. ...................................... 379/412; 379/399
[58] Field of Search ............... 379/387, 398, 399, 412, 379/437; 361/56, 119, 91

[56] References Cited

U.S. PATENT DOCUMENTS

| | | | |
|---|---|---|---|
| 4,159,500 | 6/1979 | Baumbach et al. | 379/412 |
| 4,488,008 | 12/1984 | Dellinger et al. | 379/412 |
| 4,500,158 | 2/1985 | Dola . | |
| 4,560,839 | 12/1985 | Dillard . | |
| 4,616,897 | 10/1986 | Dola . | |
| 4,624,514 | 11/1986 | Smith . | |
| 4,723,919 | 2/1988 | Crane | 439/521 |
| 4,741,032 | 4/1988 | Hampton | 379/399 |
| 4,742,541 | 5/1988 | Cwirzen et al. | 379/412 |
| 4,749,359 | 6/1988 | White | 379/399 |
| 4,764,950 | 8/1988 | Dickey et al. | 379/29 |
| 4,800,588 | 1/1989 | Poster, Jr. . | |
| 4,809,323 | 2/1989 | Collins et al. | 379/399 |
| 4,827,504 | 5/1989 | Collins et al. . | |
| 4,853,960 | 8/1989 | Smith | 379/399 |
| 4,856,060 | 8/1989 | Meyerhoeffer et al. | 379/412 |
| 4,860,350 | 8/1989 | Smith | 379/412 |
| 4,878,146 | 10/1989 | Kaczmarek | 379/412 |
| 4,881,255 | 11/1989 | Neuwirth et al. | 379/412 |
| 4,910,770 | 3/1990 | Collins et al. | 379/399 |
| 4,944,003 | 7/1990 | Meyerhoeffer et al. | 379/412 |

OTHER PUBLICATIONS

GTE Sylvania products brochure, "Solid State Station Protector—CP-560/CP-561", copyright 1989, GTE Products Corporation.

Primary Examiner—James L. Dwyer
Assistant Examiner—Mugdy Shehata
Attorney, Agent, or Firm—J. David Abernethy

[57] ABSTRACT

A station protector module contains telephone company terminals and subscriber terminals. The module has apparatus for grounding the module in a network interface device and also has means for grounding upon extended grounding current flow through a surge protector in the module. The grounding apparatus becomes operative upon the melting of a fusible means. The surge protector is a single component bidirectional voltage sensitive switch.

11 Claims, 2 Drawing Sheets

STATION PROTECTOR MODULE FOR NETWORK INTERFACE DEVICE

This is a continuation of copending application Ser. No. 07/591,99, filed on Oct. 1, 1990, now abandoned.

This invention concerns network interface devices (NID). Such NID's are located at a telephone subscriber's premises and provide a point of demarcation between telephone company lines and the telephone subscriber's wiring. The invention is particularly concerned with NID's employing station protector modules such as are shown in U.S. Pat. Nos. 4,488,008, 4,500,158, 4,560,839, 4,616,897, 4,624,514, 4,800,588 and 4,827,504. Such modules contain surge protectors, are replaceable within the NID and contain terminals for connection of the telephone subscriber's wiring.

This invention discloses a station protector module containing telephone company line terminals for connecting telephone company lines thereto. Subscriber terminals may be the same terminals or may be a separate pair. The module contains means for grounding the module in a network interface device. The module also contains means for permanently grounding the telephone company line terminals, the means becoming operative upon the melting of fusible means within the module. Grounding current flowing through a surge protector is the heating medium for the fusible means.

In this invention, the surge protector in the module is a single component bidirectional voltage sensitive switch having three lead-in wires. Two of the lead-in wires are connected to tip and ring terminals and the third lead-in wire is connected to ground. The third lead-in wire is in heat transfer relationship to a fusible pellet which melts at a predetermined temperature. Upon melting of the fusible pellet, a spring is released which results in grounding of the tip and ring terminals.

Figure 2:
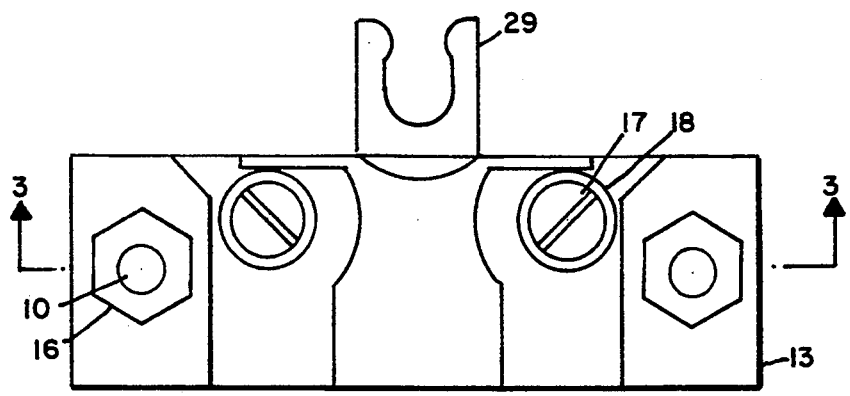
Figure 3:
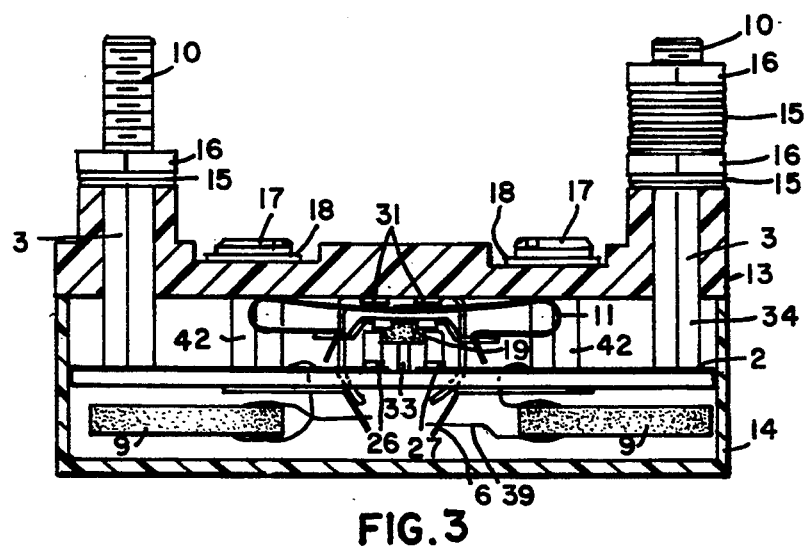
Figure 4:
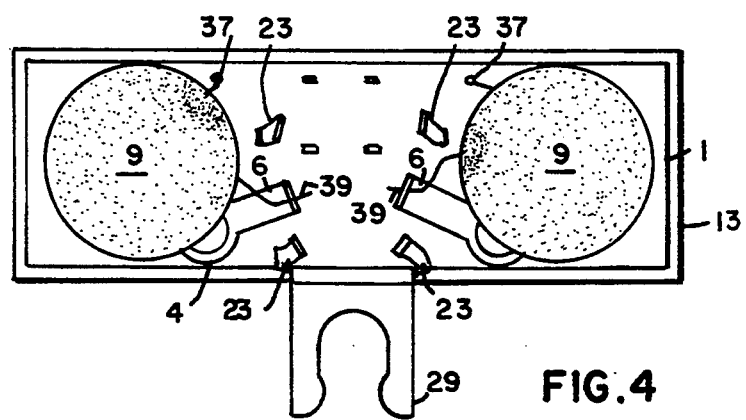

In the drawing, FIG. 1 is an exploded perspective view of a station protector module in accordance with this invention. FIGS. 2, 3 and 4 are top, front and bottom views respectively.

In one embodiment of a station protector module, as shown in the drawing, two externally threaded terminal posts 3 (only one is shown in FIG. 1) are riveted to card 1 after passing through holes 21 in tip and ring terminals 2, 2a and through holes 22 in card 1. A small washer 4 may be used on the rivet side of card 1 to prevent cracking of card 1 during the rivet operation. Hexagonal portions 34 of posts 3 rest on terminals 2, 2a thereby establishing electrical connection of posts 3 to terminals 2, 2a. Threaded portion 10 of terminal post 3 can be size #10–32 which is the standard thread size for primary telephone line station protectors.

Once posts 3 have been riveted in place, a bidirectional voltage sensitive switch (BVSS) 8 is clamped between ground cage 7 and card 1. A small portion of each terminal 2, 2a is sandwiched between BVSS 8 and card 1 in order to hold terminals 2, 2a in place during this and later assembly steps. Legs 2S of ground cage 7 extend through holes 24 of card 1 and are formed so as to hold the subassembly together. Legs 2S of ground cage 7 must be resilient enough to provide adequate clamping force on BVSS 8 during repeated thermal expansion and contraction over normal ambient and operating temperatures. The clamping force is required to prevent BVSS 8 from open-circuiting during sustained and severe electrical surges. The resiliency and sturdiness required can be provided by small lances 23 on legs 25 which, when legs 25 are twisted, hold the assembly together. Alternatively, legs 25 may be stapled under card 1. Examples of BVSS switches that may be used are Surgectors made by RCA Corporation or Sidactors made by Teccor Electronics, Inc.

Once this subassembly is complete, lead-in wire 26 of BVSS 8 is welded or soldered to tip terminal 2a and lead-in wire 27 of BVSS 8 is welded or soldered to ring terminal 2. Ground cage 7 may contain small tabs 28 to help align BVSS 8 during the assembly process. Portion 29 of ground cage 7 is the grounding means for the module; portion 29 is a spade lug shape to fit around the #10 size ground posts typically used by the industry in station protectors. Spade lug 29 can also be the mounting means for the module.

Ground cage 7, terminals 2 and 2a and posts 3 are preferably made of brass because of brass's relatively high electrical conductivity and mechanical sturdiness. Card 1 is made of a high melting plastic, such as Dupont's Rynite FR-350. Card 1 must be able to withstand temperatures in excess of 150° C., which may occur during sustained electrical surges when BVSS 8 is dissipating power.

At this stage of the assembly, a failsafe mechanism is added. The failsafe assembly includes a spring 11, a trigger 12 and a fusible pellet 19. The purpose of the failsafe mechanism is to prevent BVSS 8 from overheating and becoming a fire hazard during sustained electrical surges. Spring 11, made of spring-tempered copper alloy, is folded back on itself at both ends. Ends 30 of spring 11 are formed so that the bottom edges of ends 30 make contact with terminals 2, 2a when spring 11 is released. Trigger 12, made of electrically conductive metal, slightly squeezes ends 30 of spring 11 towards each other. In place, the upper surface of spring 11 is in contact with arms 31 of ground cage 7; fusible pellet 19 is held within arms 32 of trigger 12 and is supported on lead-in wire 33 which is bent at a right angle and rests on card 1. Lead-in wire 33 is the ground wire of BVSS 8. With fusible pellet 19 in place, ends 30 of spring 1 are elevated slightly above the surfaces of terminals 2, 2a. When fusible pellet 19 melts and no longer maintains trigger 12 elevated, the spring action of spring 11 forces ends 30 thereof down into contact with terminals 2, 2a. Since spring 11 is in physical contact with arms 31 of ground cage 7, the releasing of spring 11 permanently grounds terminals 2, 2a and thus grounds the subscriber's telephone line which is connected to terminals 2, 2a via terminal posts 3. Sustained ground current flowing through ground lead-in wire 33 will heat lead-in wire 33 and thus heat and melt fusible pellet 19 which is in physical contact with lead-in wire 33.

Cover 13, made of plastic, is then inserted onto the main subassembly. Cover 13 contains hexagonal holes 35 into which hexagonal portions 34 of posts 3 extend. This prevents post 3 from turning when nuts 16 are tightened thereon. The assembly is then placed into enclosure 14 which is also made of plastic. Cover 13 and enclosure 14 can be sealed to each other by, for example, ultrasonic welding, adhesive bonding or solvent bonding.

Telephone company wires would be connected to threaded portions 10 of posts 3 using the lower set of nut 16 and washers 15, while the telephone subscriber would use the upper set.

Another embodiment of the invention provides sneak current protection in the situation where BVSS 8 is not actuated by a surge voltage.

Before the failsafe assembly of spring 11, trigger 12 and pellet 19 is inserted into the main assembly, two internally threaded terminals S (only one is shown in FIG. 1) extend through holes 36 of card 1 and are riveted to card 1 using metal lugs 6 as a washer to prevent cracking of card 1. Lug 6 is also formed to have a small hole 38 for connection thereto, by soldering or crimping, of lead-in wire 39 of PTC thermistor 9. The other lead-in wires 41 of PTC thermistors 9 extend through holes 37 of card 1, through holes 40 of terminals 2, 2a and are soldered or welded to terminals 2, 2a. An insulating sheet 20 underlies card 1 in order to insulate PTC thermistors 9 from the rivets on the bottom of card 1. Terminals 5 also have hexagonal portions 42 which extend into hexagonal holes 43 of cover 13 to prevent turning when screw 17 is screwed into terminal 5.

In this embodiment, the telephone subscriber's wiring would be connected to terminals S using screws 17 and washers 18.

We claim:

1. A station protector module for a network interface device, the module comprising: telephone company line terminals for connecting telephone company lines thereto; subscriber terminals for connecting a telephone subscriber's wiring thereto; means for grounding the module in a network interface device; a single component bidirectional voltage sensitive switch having three lead-in wires, two of the lead-in wires being electrically connected to the telephone company line terminals, the third lead-in wire being electrically connected to the means for grounding the module; means for grounding the telephone company line terminals; said means for grounding the telephone company line terminals becoming operative upon the melting of a fusible means within the module.

2. The module of claim 1 wherein said fusible means is in physical contact with said third lead-in wire.

3. The module of claim 1 wherein the company line terminals are also the subscriber terminals.

4. The module of claim 1 comprising, in addition, PTC thermistors which are electrically connected between the company line terminals and the subscriber's terminals.

5. The module of claim 1 wherein the means for grounding the module is also the means for mounting the module in a network interface device.

6. A station protector module for a network interface device, the module comprising: a card on which are fastened tip and ring terminals; a ground cage fastened to the card; a bidirectional voltage sensitive switch (BVSS) disposed between the ground cage and the card, the BVSS having a lead-in wire electrically connected to the tip terminal, a second lead-in wire electrically connected to the ring terminal and a third lead-in wire electrically connected to the ground cage; a spring in electrical contact with the ground cage, the spring having ends slightly elevated above the tip and ring terminals; a fusible pellet in physical contact with the third lead-in wire of the BVSS, the fusible pellet maintaining the ends of the spring in said elevated position but which, upon melting, releases the spring and forces the ends thereof into contact with the tip and ring terminals.

7. The module of claim 6 wherein the ground cage includes a spade lug for mounting and grounding the module in a network interface device.

8. The module of claim 6 including terminal posts which are electrically connected to the tip and ring terminals, the terminal posts being the point of connection for telephone company lines and telephone subscriber's wiring.

9. The module of claim 6 including telephone company line terminals for connecting telephone company lines thereto, the telephone company terminals being electrically connected to the tip and ring terminals.

10. The module of claim 9 including separate subscriber terminals for connecting a telephone subscriber's wiring thereto.

11. The module of claim 10 further including PTC thermistors which are electrically in series between the tip and ring terminals and the subscriber terminals.

* * * * *

UNITED STATES PATENT AND TRADEMARK OFFICE
CERTIFICATE OF CORRECTION

PATENT NO. : 5,410,596
DATED : April 25, 1995
INVENTOR(S) : Shannon, et. al.

It is certified that error appears in the above-indentified patent and that said Letters Patent is hereby corrected as shown below:

Title page, item [73], Assignee: should read--Siecor Puerto Rico, Inc.

Signed and Sealed this

Twenty-fourth Day of October, 1995

Attest:

BRUCE LEHMAN

*Attesting Officer*  *Commissioner of Patents and Trademarks*